United States Patent
Kwon et al.

(10) Patent No.: US 8,032,121 B2
(45) Date of Patent: Oct. 4, 2011

(54) SYSTEM AND METHOD FOR TRANSFERRING VOICE MESSAGES

(75) Inventors: Hyuk-Hoon Kwon, Seoul (KR); Tae-Wook Park, Seoul (KR); Sang-Yun Lee, Gyeonggi-do (KR); Hee-Hyeok Hahm, Seoul (KR)

(73) Assignee: SK Telecom Co., Ltd. (KR)

( * ) Notice: Subject to any disclaimer, the term of this patent is extended or adjusted under 35 U.S.C. 154(b) by 617 days.

(21) Appl. No.: 11/631,253

(22) PCT Filed: Mar. 15, 2005

(86) PCT No.: PCT/KR2005/000740
§ 371 (c)(1),
(2), (4) Date: Oct. 27, 2008

(87) PCT Pub. No.: WO2006/004251
PCT Pub. Date: Jan. 12, 2006

(65) Prior Publication Data
US 2009/0041213 A1 Feb. 12, 2009

(30) Foreign Application Priority Data
Jun. 30, 2004 (KR) .................. 10-2004-0050234

(51) Int. Cl.
*H04M 11/10* (2006.01)
(52) U.S. Cl. .................. 455/413; 379/88.25
(58) Field of Classification Search ............ 379/88.25, 379/88.12; 455/413
See application file for complete search history.

(56) References Cited

U.S. PATENT DOCUMENTS

| | | | | |
|---|---|---|---|---|
| 6,181,928 | B1 * | 1/2001 | Moon | 455/415 |
| 6,259,772 | B1 * | 7/2001 | Stephens et al. | 379/88.23 |
| 6,418,306 | B1 * | 7/2002 | McConnell | 455/413 |
| 6,711,240 | B2 * | 3/2004 | Contractor | 379/88.12 |
| 6,839,555 | B2 * | 1/2005 | Alger et al. | 455/413 |
| 6,870,833 | B2 * | 3/2005 | Schwartz | 370/353 |
| 7,130,390 | B2 * | 10/2006 | Abburi | 379/88.17 |
| 2002/0160755 | A1 | 10/2002 | Alger et al. | |
| 2002/0160775 | A1 | 10/2002 | Pecen | |

FOREIGN PATENT DOCUMENTS

| | | |
|---|---|---|
| KR | 1999-0066274 A | 8/1999 |
| KR | 19990066274 | 8/1999 |
| KR | 2004-0046886 A | 6/2004 |
| KR | 20040046866 | 6/2004 |

* cited by examiner

*Primary Examiner* — Simon Sing
(74) *Attorney, Agent, or Firm* — Baker & Hostetler LLP

(57) ABSTRACT

Disclosed herein are a system and method for transferring voice messages. The system includes a voice message server. When a voice message and called terminal information are transmitted from a calling terminal, the voice message server stores the voice message, searches for a connection mute to the called terminal with reference to the called terminal information, and transmits a reception request signal to the called terminal. Furthermore, when the called terminal responds to the reception request signal, the voice message server reproduces the voice message. Furthermore, when the called terminal does not respond to the reception request signal and the reception request signal is forwarded to a different receiving object, the voice message server checks whether the route of the reception request signal has been changed and interrupts the transmission of the voice message. Accordingly, an additional communication charge may be avoided.

13 Claims, 5 Drawing Sheets

SYSTEM AND METHOD FOR TRANSFERRING VOICE MESSAGES

TECHNICAL FIELD

The present invention relates to a system and method for transferring voice messages and, more particularly, to a system and method for transferring voice messages, in which an originator can easily send a voice message and a recipient can listen to a voice message by only the simple action of responding to paging.

BACKGROUND ART

With the development of wired/wireless communication technology, the number of wired Internet users and mobile communication service subscribers are increasing daily. One of the advantages of these communication services is that information can be exchanged and conversations held using a variety of means, such as electronic (e)-mail, messenger service, a character message, or a voice mailbox, without a face-to-face meeting between individuals.

In particular, the voice mailbox service is a service in which a mobile communication system connects a calling terminal to a voice mailbox and allows the calling terminal to record a voice message when an originator attempts a call to a mobile communication terminal but the power of the called terminal is such that the called terminal cannot respond to it. When the called terminal becomes capable of responding to a call, the mobile communication system notifies the called terminal that a voice message has arrived, so that the called terminal may connect to a voice mailbox and a user may listen to the stored voice.

FIG. 1 is a block diagram illustrating a general voice mailbox service method.

A mobile communication system 200 includes: Base Transceiver Systems (BTSs) 210 and 220 for communicating with mobile communication terminals 10 and 20 in a wireless region; a Base Station Controller (BSC) 230 for managing a plurality of BTSs; a Mobile Switching Center (MSC) 240 connected to the BSC 230 to exchange calls, and connected to a Public Switched Telephone Network (PSTN) 600 to enable a connection between a wired telephone 700 and a mobile communication terminal 10 or between a wired telephone 700 and a mobile communication terminal 20; a Home Location Register 250 connected to the MSC 240 to manage mobile communication service subscriber information, location information, and information related to supplementary services; a Packet Data Service Node (PDSN) 260 connected to the BSC 230 to enable packet data service; and a Data Core Network (DCN) 270 for connecting the mobile communication system 200 and the Internet 400. Furthermore, the MSC 240 is connected to a Voice Message Service (VMS) center 280.

In the mobile communication system, when a mobile communication terminal user transmits a voice call, the HLR 250 checks a routing path to a called terminal with reference to a called terminal number, and requests a call setup from a called MSC, and the called MSC transmits a paging signal to the called terminal. If the called terminal does not respond to the paging signal within a predetermined time, the called MSC switches the connection with the called terminal to a VMS center 280 and, as a result, a call is set up between the railing mobile communication terminal 10 and the VMS center 280.

Accordingly, the VMS center 280 transmits a guidance announcement, to enable a voice message to be recorded in the calling terminal and, thus, allows the voice message to be input from the calling terminal 10. The message is stored while matching the input voice message to the called terminal number, and the called terminal is notified that a voice message has been received. Thereafter, when the called terminal, which is provided with notification about the reception of the voice message, is connected to the VMS center 280, the VMS center 280 transmits the voice message, which has been stored in the VMS center 280, to the called terminal.

That is, the current voice message service, which is provided when the called mobile communication terminal cannot respond to an incoming call, is disadvantageous in that an originator must record a voice message even when it is not desired, and a recipient must pay an additional communication charge to check voice messages.

To solve these problems, a service, which transmits a paging signal from a mobile communication network to the called terminal when an originator inputs a called terminal number along with a specific symbol and then inputs a voice message, and causes the voice message, which is input by an originator, to be reproduced when the called terminal responds to the paging signal service, is being researched. However, even with the voice message transmission service, if the called terminal is powered off or is using other communication services, or a called terminal user does not respond, a reception request signal from the mobile communication network is forwarded to the VMS center 280. Accordingly, a recipient must connect with the VMS center 280 and check voice messages. As a result, this case is problematic in that a process of checking a voice message is inconvenient and an additional communication charge must be paid, like the conventional voice mailbox service.

DISCLOSURE OF THE INVENTION

Accordingly, the present invention has been made keeping in mind the above problems occurring in the prior art, and an object of the present invention into provide a system and method for transferring voice messages, in which, when a called terminal cannot respond to a reception request signal for reproducing a voice message, or does not respond to it, the reception request signal is forwarded to a different receiving object to prevent a voice message from being stored in the different receiving object.

BEST MODE FOR CARRYING OUT THE INVENTION

In order to accomplish the above object, the present invention provides a system for transferring voice messages, the system being connected with a plurality of mobile communication terminals through a mobile communication system, connected with a plurality of personal computer terminals through the Internet, and connected with a plurality of wired telephone terminals through a PSTN to transmit a voice message between the terminals. The system includes a voice message server for, when the voice message and called terminal information are transmitted from a calling terminal, storing the voice message, searching for a connection route to the called terminal with reference to the called terminal information, and transmitting a reception request signal to the called terminal, reproducing the voice message when the called terminal responds to the reception request signal, and checking whether the route of the reception request signal has been changed and interrupting the transmission of the voice message when the called terminal does not respond to the reception request signal and the reception request signal is forwarded to a different receiving object.

Preferred embodiments of the present invention are described in detail with reference to the accompanying drawings below. Furthermore, in the present invention, a calling terminal may be one of a mobile communication terminal, a Personal Computer (PC) to which an Internet connection is available, and a wired telephone connected to a PSTN. A called terminal is one of: a mobile communication terminal, a PC to which an Internet connection is available, and a wired telephone connected to a PSTN. For convenience of description, the case where both the calling terminal and the called terminal are mobile communication terminals is described below as an example.

Figure 1:
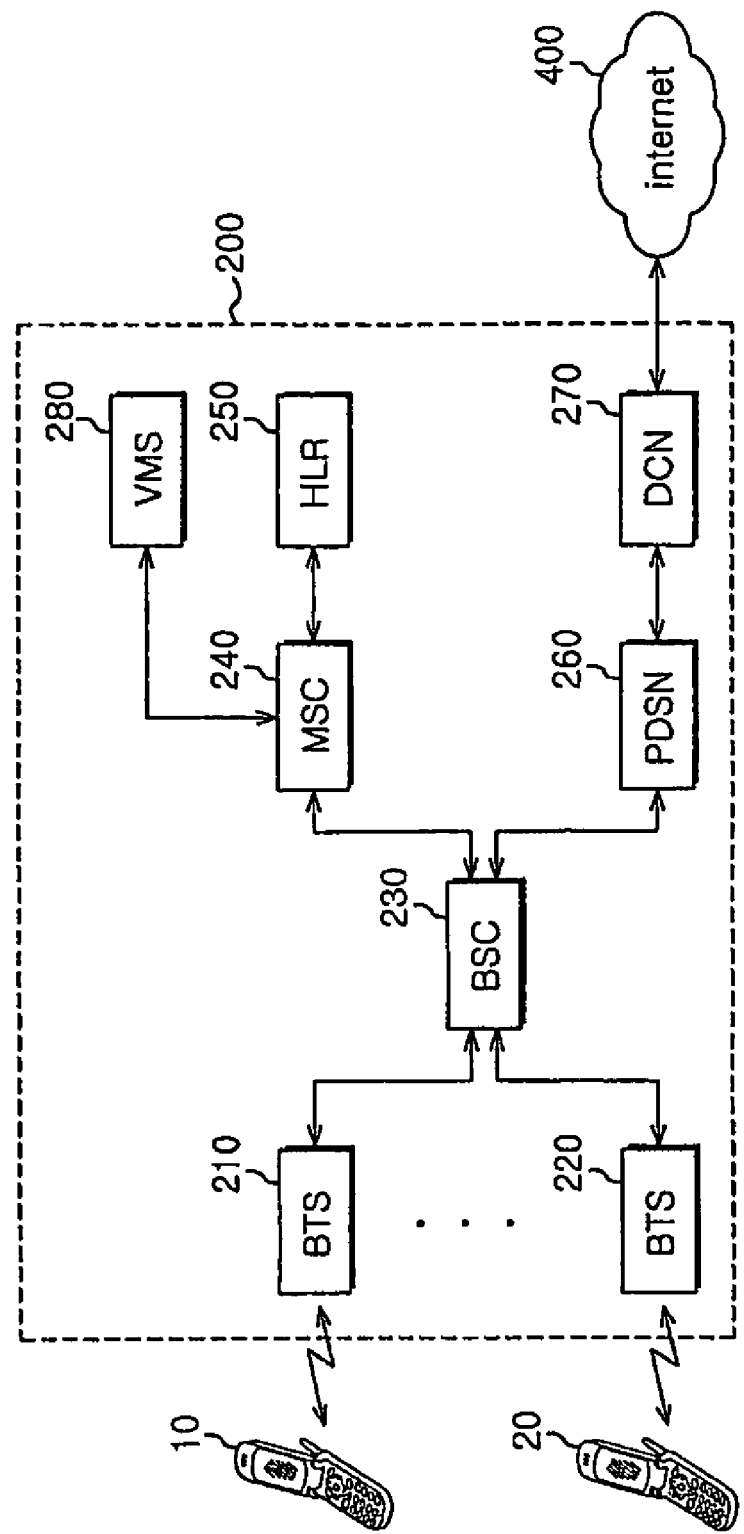
FIG. 1 is a block diagram illustrating a general voice mailbox service method.
Figure 2:
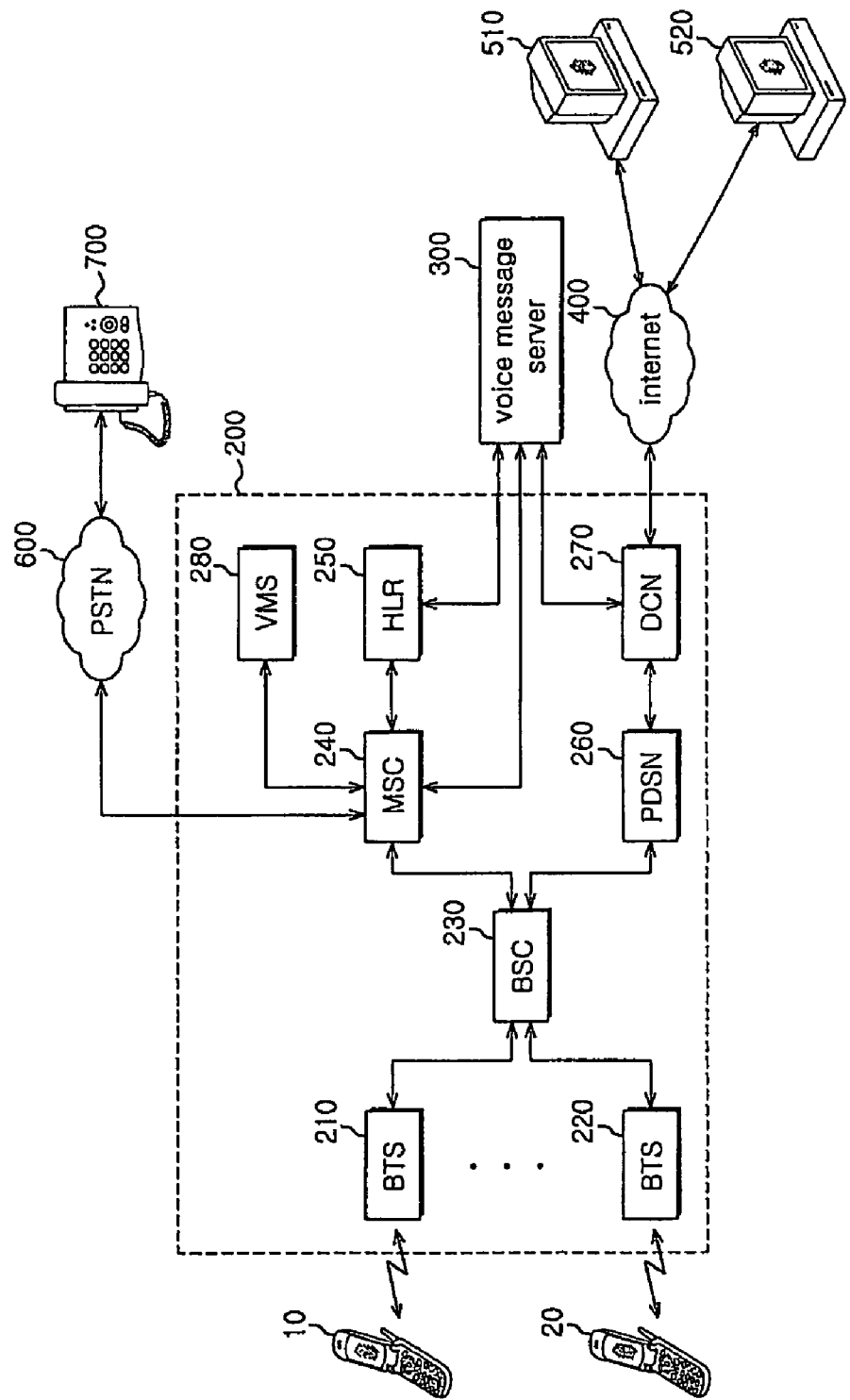
FIG. 2 is a block diagram illustrating the construction of a system for transferring voice messages in accordance with the present invention.

FIG. 2 is a block diagram illustrating the construction of a system for transferring voice messages in accordance with the present invention.

As shown in FIG. 2, the system for transferring voice messages includes a plurality of mobile communication terminals 10 and 20, a mobile communication system 200 for providing voice and data services to the plurality of mobile communication terminals 10 and 20, a voice message server 300 connected to the mobile communication terminals 10 and 20 through the mobile communication system 200 to perform a message transmission function, a plurality of PCs 510 and 520 for enabling the use of the data service via the Internet 400, and a plurality of wired telephones 700 for providing a telephone service via a PSTN 600.

When the calling terminal records a voice message and transmits the recorded voice message along with a called number, or is connected to the voice message server 300 to transmit a voice message and a called number, the voice message server 300 receives and stores the voice message and the called number through the mobile communication system 200, and then transmits a reception request signal, that is, a paging signal, to the called terminal through the mobile communication system 200 with reference to the called terminal number, thus setting up a call with the called terminal. Thereafter, the voice message server 300 reproduces and transmits the stored voice message when the called terminal responds to the reception request signal.

Furthermore, when the called terminal does not respond to the reception request signal, or the called terminal is powered off or is using other communication services, the voice message server 300 determines that the reception request signal has been forwarded to a different receiving object and performs a function of interrupting the reception of signals such that the reception request signal is forwarded to the different receiving object (for example, a VMS center 280) and the voice message is not stored in the different receiving object.

Figure 3:
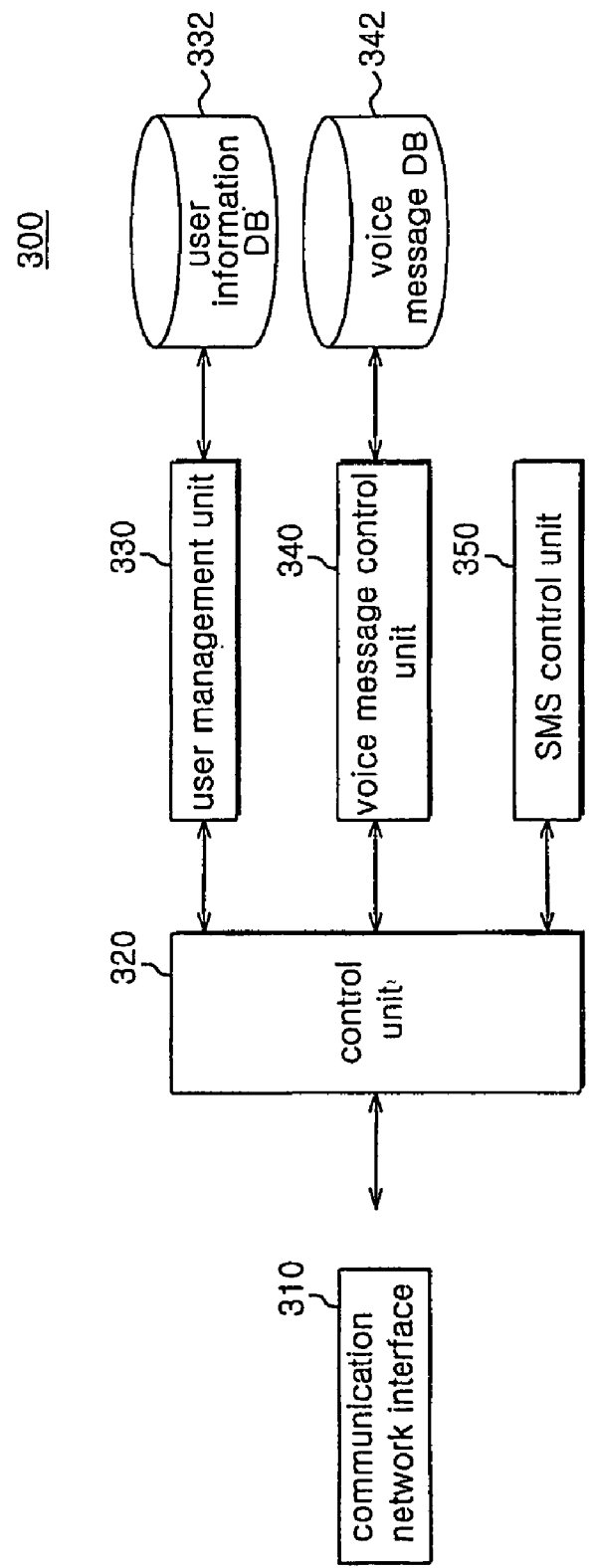
FIG. 3 is a block diagram showing the detailed construction of a voice message server shown in FIG. 2.

FIG. 3 is a block diagram showing the detailed construction of a voice message server shown in FIG. 2.

As shown in FIG. 3, the voice message server 300 includes a communication network interface 310 having a wired communication network interface connected to the mobile communication system 200 to perform data transmission and reception, and a wired communication network interface connected to the Internet 400 through a DCN to perform data transmission and reception, a control unit 320 for controlling the overall operation of the voice message server 300, a user management unit 330 for storing the information (a mobile communication terminal number, an Internet Protocol (IP) address, an e-mail address, and a connected IDentification (ID)) of a user, using a voice message service in a user information DataBase (DB) 332 and managing the information, and a voice message control unit 340 for storing a voice message, which has been transmitted from the calling terminal, along with the called terminal information, in a voice message DB 342, managing them, and transferring the voice message to a corresponding called terminal.

In the case in which a voice message is transmitted to the called terminal and the recipient checks the transmitted voice message, the voice message server 300 may further include a Short Message Service (SMS) control unit 350 for informing the calling terminal of the reception of the voice message. Furthermore, although not shown in FIG. 3, the voice message server 300 may further include a guidance announcement providing unit for providing a guidance announcement that directs, in the calling terminal, processes of recording the voice message and inputting called terminal information. In this case, the guidance announcement can be implemented in the form of voice, text, an image, a moving picture, or a combination thereof.

The voice message and the called terminal number that are inputted into the calling terminal are transmitted to the communication network interface 310, and the voice message control unit 340 stores the voice message and the called terminal number along with the called terminal information in the message DB 342 under the control of the control unit 320. Furthermore, the voice message control unit 340 checks the location information about the called terminal through an HLR with reference to the called terminal information, and transmits the reception request signal for transferring a voice message to a corresponding called terminal through the called MSC with reference to the checked result. Thereafter, when the called terminal responds to the reception request signal, the voice message control unit 340 reproduces a corresponding voice message.

If the called terminal cannot respond to the reception request signal, for example, if the called terminal is powered off or is using other communication services, the MSC of the mobile communication system recognizes this status, so that the MSC does not transmit the reception request signal to the called terminal, becomes directly connected to a different receiving object (for example, the VMS 280), and transmits a response message, which indicates that it has been connected to the different receiving object, to the voice message server 300.

If the response message, corresponding to the reception request signal transmitted to the MSC, is transmitted within a first predetermined time, the voice message server 300 determines that the MSC has been connected to the different receiving object, terminates the connection with the MSC, and interrupts the transmission of the voice message. This can be applied to the case in which the MSC does not separately transmit the guidance announcement to the voice message server 300 and performs call processing by call forwarding, when the MSC is connected to the different receiving object. The first predetermined time must be generally set to a time shorter than the shortest time within which the MSC can page the called terminal and the called terminal can respond to the paging.

Meanwhile, the voice message server 300 can transmit the reception request signal to the MSC and then transmit a signal to check whether call forwarding has been carried out. In the case in which the called terminal cannot respond to the call request of the MSC, the MSC recognizes the status of the called terminal. Accordingly, the MSC does not transmit the reception request signal to the called terminal and immediately attempts a connection to the different receiving object (for example, the VMS 280), and transmits the response message, corresponding to the signal for checking whether call forwarding has been carried out, which is transmitted by the voice message server 300, to the voice message server 300.

When the response message, corresponding to the signal for checking whether call forwarding has been carried out, which is transmitted to the MSC, is transmitted within the second predetermined time, the voice message server 300 determines that the MSC has been connected to the different receiving object, thereby terminating the connection with the MSC and interrupting the transmission of the voice message. In contrast, when the response message, corresponding to the signal for checking whether call forwarding has been carried out, which is transmitted to the MSC, is not transmitted within the second predetermined time, the voice message server 300 determines that the MSC is transmitting the paging signal to the called terminal. This can be applied to the case in which, before the connection of the MSC is switched to the different receiving object, the MSC carries out call forwarding after the guidance announcement is transmitted, either to the voice message server or from the VMS center through the MSC. In this case, the signal for checking whether call forwarding has been carried out is a Dual Tone MultiFrequency (DTMF) signal. Furthermore, the second predetermined time refers to a time shorter than the shortest time within which a voice message storage mode can start after the reception request of the voice message server 300 has been forwarded to the VMS center 280.

For example, in the case in which the voice message server 300 transmits the reception request signal to the MSC but the called terminal cannot respond to the reception request signal, the MSC forwards a call to the VMS center 280 and is connected to the VMS center 280.

In the case where the MSC or the VMS center provides a voice message service without transmitting a separate guidance announcement, that is, in the case of connecting to the VMS center, and, at the same time recording the voice message, the MSC transmits a response signal corresponding to the reception request signal to the voice message server immediately after being connected to the VMS center. When the response signal from the MSC is transmitted within the first predetermined time (the shortest time within which the mobile communication terminal can respond after the transmission of the reception request signal), the voice message server determines that the MSC has been connected to the VMS center 280 and thereby interrupts the transmission of the voice message.

When the MSC or the VMS center provides a voice message service by transmitting the guidance announcement, that is, when whether the connection of the VMS center is made is determined using the DTMF signal, the voice message server transmits the reception request signal to the MSC and then transmits the DTMF signal. Thereafter, when the MSC transmits the response signal corresponding to the DTMF signal to the voice message server 300 within the second predetermined time, the voice message server 300 determines that the MSC has been connected to the VMS center and interrupts the transmission of the voice message.

Figure 4:
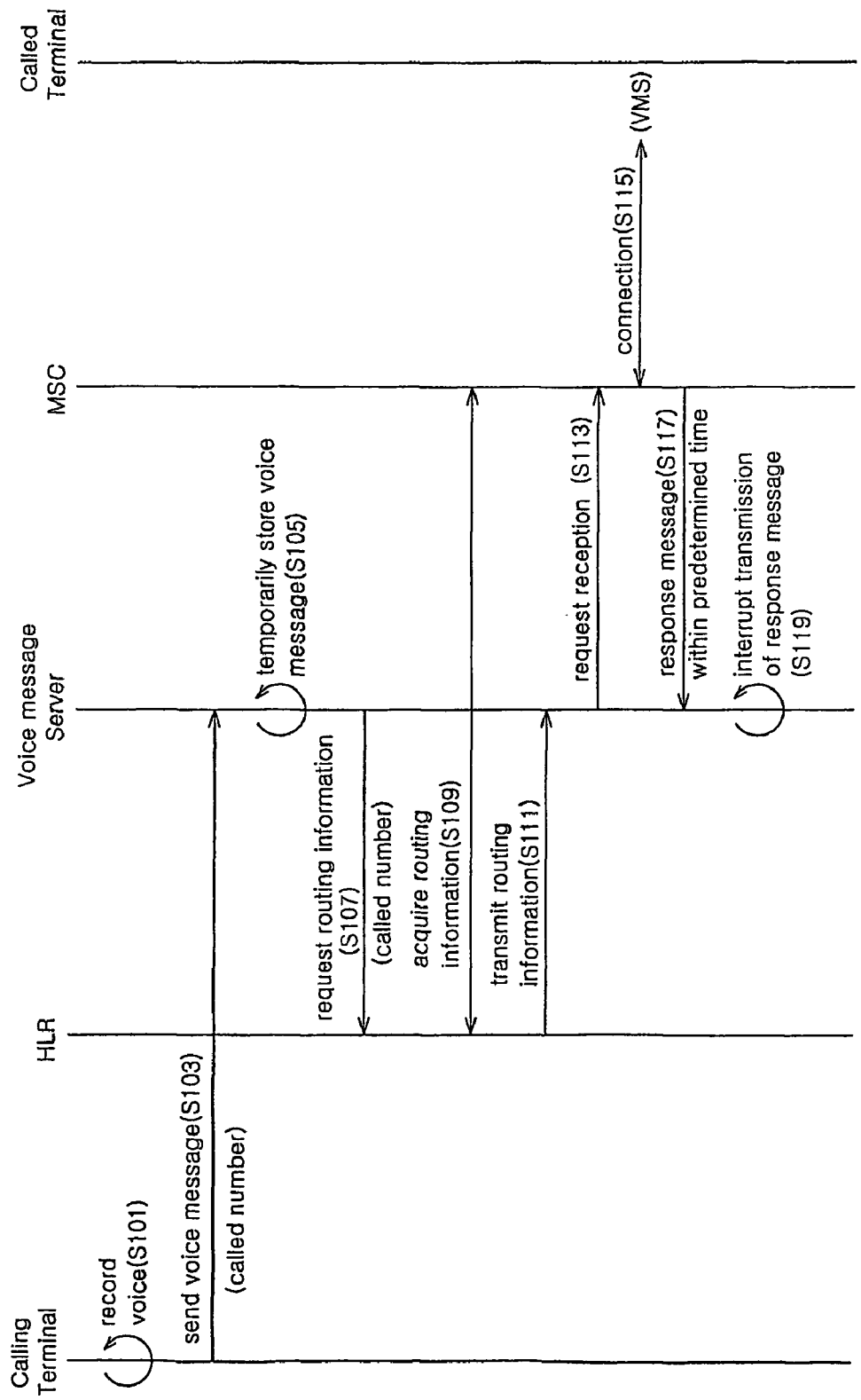
FIG. 4 is a view illustrating a method of transferring voice messages in accordance with an embodiment of the present invention.

FIG. 4 is a view illustrating a method of transferring voice messages in accordance with an embodiment of the present invention, and illustrates a method of transferring a voice message when the called terminal does not respond to the reception request signal because it is powered off or is using other communication services, and the MSC does not provide a separate guidance announcement before switching the connection thereof to a different receiving object.

The originator inputs a voice message to the calling terminal which is recorded at step S101, and transmits the voice message along with a called terminal number to the voice message server 300 at step S103. In this case, it is also possible for the originator to connect the calling terminal to the voice message server 300 and transmit the voice message and the called terminal number. The voice message control unit 340 of the voice message server 300 temporarily stores the received voice message in the voice message DB 342 at step S105, and then requests a routing path to the called terminal from the HLR 250 of the mobile communication system 200 with reference to the called terminal number at step S107.

Accordingly, the HLR 250 searches for the called MSC with reference to the stored called terminal information, and acquires information about routing to the called MSC, at step S109. Thereafter, the HLR 250 transmits the acquired information about routing to the voice message server 300 at step S111. The voice message server 300 requests reception from the called MSC with reference to the routing information, which is acquired at step S111, at step S113. Accordingly, the called MSC requests reception by transmitting a paging signal to the called terminal, and the voice message server 300 reproduces the stored voice message via a mobile communication network when the called terminal responds to the reception request signal, so that the user of the called terminal can listen to the voice message.

Meanwhile, when the called terminal cannot respond to the reception request signal because it is powered off or is using other communication services, the MSC does not transmit the reception request signal to the called terminal, and is connected to a different receiving object, for example, the Voice Message Service (VMS) center 280, and transmits the reception request signal to it, at step S115. Thereafter, the MSC transmits a message, which is a message for indicating that the VMS center 280 has responded to the reception request, to the voice message server 300 at step S117. The voice message control unit 340 of the voice message server 300 checks whether the response message, which is transmitted from the MSC, has been transmitted to the MSC within a first predetermined time from the time when the reception request signal was transmitted. When it is determined that the response message has been transmitted within the first predetermined time, the voice message control unit 340 interrupts the transmission of the voice message at step S119, and stores the voice in the DB 342. In this case, when the paging signal is transmitted from the MSC to the called terminal, the fast predetermined time must be set to a time shorter than the shortest time within which the called terminal can respond to the reception request signal.

Figure 5:
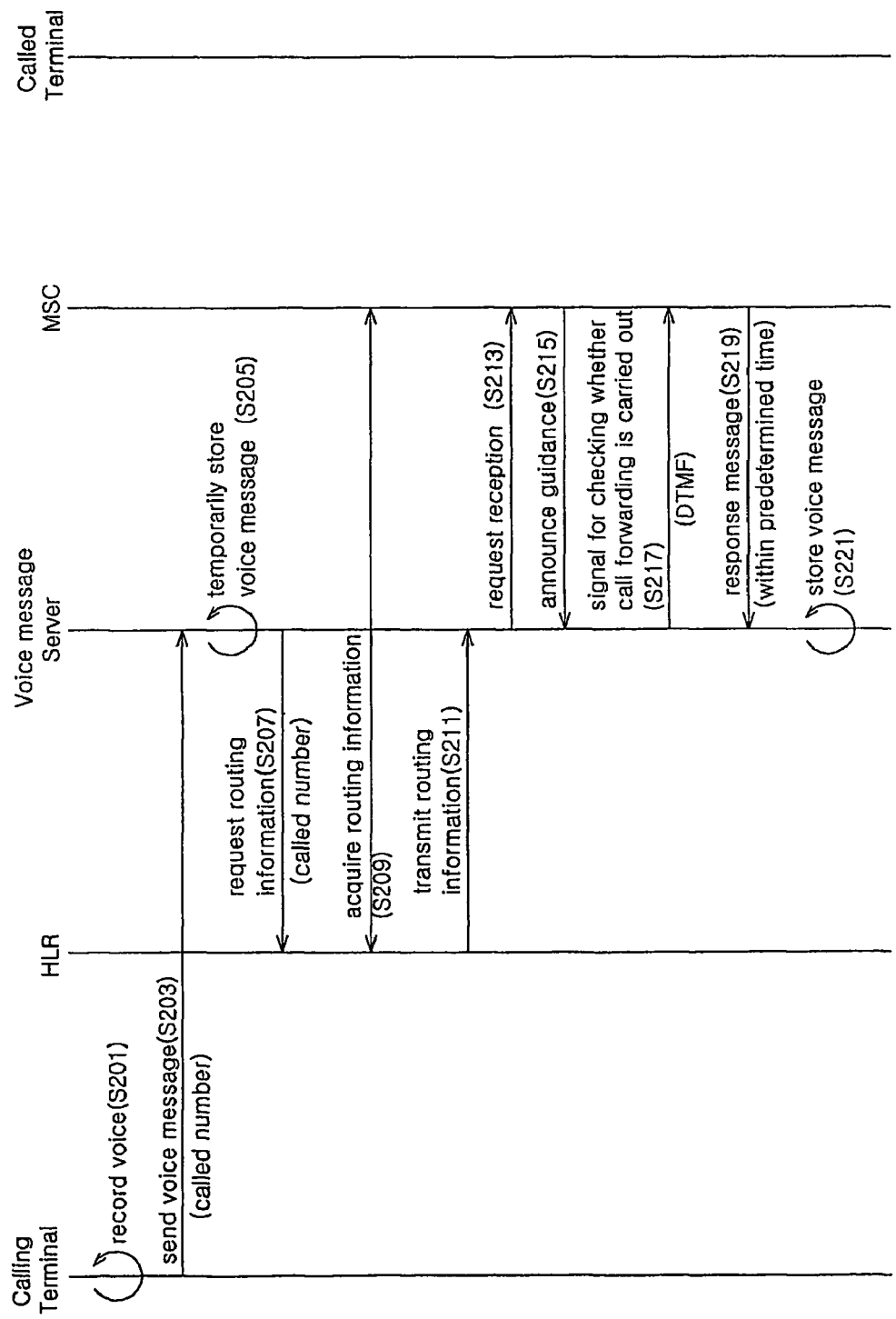
FIG. 5 is a view illustrating a method of transferring voice messages in accordance with another embodiment of the present invention.

FIG. 5 is a view illustrating a method of transferring voice messages in accordance with another embodiment of the present invention, and illustrates a method of transferring a voice message when the called terminal does not respond to the reception request signal because it is powered off or is using other communication services, and the MSC does not provide a separate guidance announcement before switching the connection thereof to a different receiving object.

The originator inputs a voice message through the calling terminal and makes a recording at step S201 and transmits the voice message along with a called terminal number to the voice message server 300 at step S203. In this case, it is also possible for the originator to connect the calling terminal to the voice message server 300 and transmit the voice message and the called terminal number. The voice message control unit 340 of the voice message server 300 temporarily stores the received voice message in the voice message DB 342 at step S205, and then requests a routing path to the called terminal from the HLR 250 of the mobile communication system 200 with reference to the called terminal number at step S207.

Accordingly, the HLR 250 searches for the called MSC with reference to the stored called terminal information, and acquires information about routing to the called MSC, at step S209. Thereafter, the HLR 250 transmits the acquired information about routing to the voice message server 300 at step S211. The voice message server 300 requests reception from the called MSC with reference to the routing information, which is acquired at step 211, at step S213. Accordingly, the called MSC requests reception by transmitting a paging signal to the called terminal, and the voice message server 300 reproduces the stored voice message via a mobile communication network when the called terminal responds to the reception request signal, so that the user of the called terminal can listen to the voice message.

Meanwhile, when the called terminal cannot respond to the reception request signal because it is powered off or is using other communication services, the MSC attempts reception to the different receiving object, for example, the VMS center 280, without transmitting the reception request signal to the called terminal, and transmits a guidance announcement, which indicates this, to the voice message server 300 at step S215. The guidance announcement may be transmitted from the VMS center 280 to the voice message server 300 through the MSC.

Accordingly, the voice message server 300 transmits a signal for checking whether call forwarding to the VMS center 280 has been carded out to the MSC so that the reception request signal to the called terminal is forwarded to the VMS center 280 and voice recording, to be carried out by the VMS center 280, is interrupted, at step S217, and the MSC transmits the response message upon the interruption, that is, the call forwarding to the VMS center 280, to the voice message server 300 at step S219. In practice, the signal for checking whether call forwarding has been carried out is a DTMF signal that determines whether the connection to the VMS center 280 has been made, and the response message that is transmitted to the voice message server 300 by the MSC is a response message corresponding to the DTMF signal. Furthermore, it is preferred that the signal for checking whether call forwarding has been carried out be controlled while the guidance announcement is transmitted.

Thereafter, the voice message control unit 340 of the voice message server 300 interrupts the reception process when it is determined that the response message, transmitted from the MSC, has been transmitted within a second predetermined time after the transmission of the signal for checking whether call forwarding has been carried out, at step S221, and stores the voice message in the DB 342.

Although not shown in FIG. 5, when the voice message server 300 transmits the signal for checking whether call forwarding to the MSC has been carried out but the response message is not transmitted from the MSC within the second predetermined time, the voice message server 300 determines that paging of the called terminal is being carried out and waits for the response of the called terminal.

As described above, although the case where the calling terminal and the called terminal are mobile communication terminals has been described as an example, the calling and called terminals may be any type of terminals to which communication service is available. Furthermore, the called object, to which an incoming call is forwarded, may vary according to the type of the called terminal, and the method of checking whether the incoming call is forwarded may be changed to conform to each case.

In the present invention described above, those skilled in the art will appreciate that the present invention may be implemented in some other concrete forms without departing from the technical spirit or essential characteristics thereof. Accordingly, it should be understood that the above-described embodiments are illustrative but not restrictive. The scope of the present invention is defined by the appended claims rather than the detailed description, and it should be appreciated that all the modifications derived from the claims and the equivalents thereof are all included in the scope of present invention.

Industrial Applicability

In accordance with the present invention described above, when the called terminal does not respond to the reception request signal in the voice message transmission service that transmits a paging signal to a called terminal, and that allows a called terminal, which responds to the paging signal to reproduce a voice message, an incoming call for reproducing the voice message is forwarded to a different receiving object and the storage of the voice message in the different receiving object is interrupted, so that it is unnecessary to connect the called terminal to the different receiving object to check the voice message and, therefore, an additional communication charge can be avoided.

The invention claimed is:

1. A system for transferring voice messages, the system being connected with a plurality of mobile communication terminals through a mobile communication system, connected with a plurality of personal computer terminals through the Internet, and connected with a plurality of wired telephone terminals through a Public Switched Telephone Network (PSTN) to transmit a voice message between the terminals, the system comprising:
    a voice message server for, when the voice message and called terminal information are transmitted from a calling terminal, storing the voice message, searching for a connection route to the called terminal with reference to the called terminal information, and for generating a reception request signal after receipt of the voice message;
    a Mobile Switching Center (MSC) for transmitting the reception request signal generated by the voice message server to the called terminal, reproducing the voice message when the called terminal responds to the reception request signal, and checking whether the route of the reception request signal has been changed to a different receiving object and when the called terminal does not respond to the reception request signal and the reception request signal is forwarded to the different receiving object the voice message server terminates the connection with the MSC and the voice message is not transmitted.

2. The system according to claim 1, wherein the voice message server comprises:
    a wired and wireless communication network interface;

a user management unit for storing user information in a DataBase (DB), which is used to transmit the voice message, and managing the stored user information; and a voice message control unit for storing the voice message, which is transmitted from the calling terminal that is the mobile communication terminal or the personal computer, along with the called terminal information, in the DB and managing the stored message and information, and transmitting the reception request signal to the called terminal through said Mobile Switching Center (MSC), for reproducing the voice message when the called terminal responds to the reception request signal, and not transmitting the voice message when the called terminal does not respond to the reception request signal.

3. The system according to claim 2, wherein the voice message control unit interrupts a process of transferring the voice message to a different receiving object when a reception response message is received from the MSC within a first predetermined time from the time when the reception request signal is transmitted to the MSC, the first predetermined time being shorter than a shortest time within which the called terminal can respond to the reception request signal for not transmitting the voice message.

4. The system according to claim 2, wherein the voice message control unit transmits a signal for checking whether call forwarding to the called MSC has been carried out after transmitting the reception request signal to the called MSC, does not transmit the voice message when a reception response message, which is received from the called MSC within a second predetermined time from a time when the signal for checking whether call forwarding has been carried out, is transmitted, the second predetermined time being shorter than a shortest time within which storage of the voice message can start after the call forwarding has been carried out.

5. The system according to claim 4, wherein the signal for checking whether call forwarding has been carried out is a Dual Tone MultiFrequency (DTMF) signal.

6. The system according to claim 2, wherein the voice message server further comprises a Short Message Service (SMS) control unit for notifying the calling terminal that the called terminal has received the voice message.

7. The system according to claim 2 wherein the voice message server further comprises a guidance announcement providing unit for directing the processes of recording the voice message and inputting the called terminal information to the calling terminal.

8. The system according to claim 7, wherein the guidance announcement providing unit provides tile guidance announcement in a form of voice, text, an image, a moving picture, or a combination thereof.

9. A method of transferring voice messages, comprising the steps of:

a voice message server storing a voice message when receiving a voice message, including called terminal information, from a calling terminal through a communication network;

the voice message server requesting information about routing to the called terminal as well as the called terminal information from the communication network;

the voice message server transmitting a reception request signal to a called MSC, to which the called terminal is connected, based on the routing information;

the called MSC transmitting the reception request signal to the called terminal when the called terminal is capable of responding to the reception request signal, and reproducing the voice message when the called terminal responds to the reception request signal;

the called MSC forwarding the call request to a different receiving object when the called terminal is not capable of responding to the reception request signal, and transmitting a response message corresponding to the reception request signal to the voice message server, and if the voice message server receives the response message corresponding to the reception request signal within a first predetermined time, determined from the time when the voice message server transmits the reception request signal to the called MSC, with the first predetermined time being shorter than a shortest time within which the called terminal can respond to the reception request signal, the voice message is not transmitted to the different receiving object.

10. The method according to claim 9, further comprising the step of notifying the calling terminal that the voice message has been transmitted after the step of reproducing the voice message, when the called terminal responds to the reception request signal.

11. The method according to claim 9, wherein the determination of whether the reception request signal forwarded to the different receiving object on the voice message server is the step of determining that the reception request signal has been forwarded to the different receiving object, if the called terminal is powered off or is using other communication services.

12. The method according to claim 9, wherein a signal is transmitted to the called MSC for determining whether call forwarding has been carried out before the MSC transmits the response message, corresponding to the reception request signal to a different receiving object; and the step of the voice message server determining whether the reception request signal is forwarded to the different receiving object is the step of determining that the reception request signal has been forwarded to the different receiving object when the called MSC transmits the reception response message within a second predetermined time from a time the signal is transmitted to determine if call forwarding has been carried out, the second predetermined time being shorter than the shortest time within which storage of the voice message can start after the call forwarding has been carried out.

13. The method according to claim 12, wherein the signal for checking whether call forwarding has been carried out is a DTMF signal.

\* \* \* \* \*